(12) United States Patent
Chang

(10) Patent No.: US 8,059,311 B2
(45) Date of Patent: Nov. 15, 2011

(54) FONT AND LINE ART RENDERING FOR MULTI-BIT OUTPUT DEVICES

(75) Inventor: Ching-Wei Chang, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 889 days.

(21) Appl. No.: 12/023,878

(22) Filed: Jan. 31, 2008

(65) Prior Publication Data

US 2009/0195795 A1    Aug. 6, 2009

(51) Int. Cl.
*H04N 1/52* (2006.01)
(52) U.S. Cl. .................. 358/1.9; 358/3.01; 358/3.06
(58) Field of Classification Search .............. 358/1.1, 358/1.9, 3.01, 3.06, 3.1, 3.21, 3.24, 534
See application file for complete search history.

(56) References Cited

U.S. PATENT DOCUMENTS

| | | | |
|---|---|---|---|
| 4,788,598 A * | 11/1988 | Ochi et al. ............... | 358/3.01 |
| 5,258,849 A | 11/1993 | Tai et al. | |
| 5,365,348 A | 11/1994 | Drees et al. | |
| 5,535,307 A | 7/1996 | Glass | |
| 5,627,652 A | 5/1997 | Motamed et al. | |
| 5,903,713 A | 5/1999 | Daels et al. | |
| 6,014,226 A | 1/2000 | Harrington et al. | |
| 6,178,011 B1 | 1/2001 | Lin | |
| 7,170,640 B2 | 1/2007 | Van de Velde et al. | |
| 7,224,489 B2 | 5/2007 | Loce et al. | |
| 2002/0067509 A1 | 6/2002 | Roylance | |
| 2005/0190408 A1 | 9/2005 | Vittitoe | |
| 2006/0050317 A1 | 3/2006 | Foster et al. | |

FOREIGN PATENT DOCUMENTS

| | | |
|---|---|---|
| EP | 0 946 049 B1 | 6/2002 |
| JP | 11-331584 | 11/1999 |

OTHER PUBLICATIONS

Nonfinal Office Action for U.S. Appl. No. 12/023,876 dated Sep. 16, 2010.
Notice of Allowance for U.S. Appl. No. 12/023,876 mailed Nov. 12, 2010.

* cited by examiner

*Primary Examiner* — Thomas D Lee
(74) *Attorney, Agent, or Firm* — Michael Blaine Brooks, P.C.; Michael Blaine Brooks; David Ripma

(57) ABSTRACT

Multilevel color page image rendering via multi-bit output devices including the rounding of tone levels, dual tone scan patterns and the selecting or generating of halftone cells and electrophotography engines and image processors for rendering multilevel tone density objects such as font and line art.

15 Claims, 12 Drawing Sheets

FONT AND LINE ART RENDERING FOR MULTI-BIT OUTPUT DEVICES

CROSS-REFERENCE TO RELATED APPLICATIONS

This application is related to patent application Ser. No. 12/023,876, filed Jan. 31, 2008.

FIELD OF ENDEAVOR

The invention is related generally to static presentation processing, e.g., processing data for printing, and the invention, in its several embodiments, particularly relates to multilevel image rendering, e.g., color page rendering methods, systems and devices.

BACKGROUND

Generally, rendering addresses the processing of image data pertaining to an object for purposes of displaying the rendered object to a viewer such as human visual processing. When the display of the rendered object is via a printed rendering, properties of the printer may limit the gradations in tone and continuity of the object as expressed in pixels. A means of achieving apparent tonal graduations is via the application of halftoning. Halftoning may be described as applying a high frequency/low frequency dichotomy having a low frequency attribute and a high frequency attribute. For example, the low frequency attribute may be a local area of the output image designated as a halftone cell. Each equal-sized cell relates in size and location to a corresponding area of the continuous-tone input image. Within each cell, the high frequency attribute may be a centered, variable-sized, halftone dot or pixel composed of ink or toner.

Single level digital halftoning uses a raster image or bitmap within which each monochrome picture element, or pixel, may be on or off as to the application of a colorant, that is, tone or no tone, ink or no ink, may be applied. For a particular color, including black, the ratio of the colored area to the non-colored area of the output cell corresponds to the luminance or gray level of the input cell. From a suitable distance, human visual processing averages both the high frequency apparent gray level approximated by the ratio within the cell and the low frequency apparent changes in gray level between adjacent equally-spaced cells and centered dots. To achieve this effect, the digital halftone cell contains groups of monochrome pixels within the same-sized cell area. A higher screen frequency halftone may be applied to text quality, for example, via an eight-by-eight sized cluster dot screen. But such halftoning does not maximize output pixel coverage and so may result in broken shapes and missing lines, particularly for fine rendering of fonts and lines of light gray levels. There remains a need for improved rendering quality for color multi-function-printers.

Printing devices that are capable of printing objects rendered in pixels having two or more density levels, that is two or more gray levels, have a second means of approaching the appearance of a continuous tone scale over the binary state afforded single level halftoning. Accordingly, multilevel halftoning, i.e., the application of two or more density levels for toning or pigmenting may be applied in conjunction with halftoning to generate refined renderings.

SUMMARY

Method and image processor embodiments of the present invention includes methods of multilevel rendering and image processors for effecting multilevel rendering such as for font and line art color page rendering for multi-bit output devices. For example, a method of multilevel tone density rendering may comprise the steps of: (a) determining a maximum tone density level of a color component of an object wherein the object data comprises a plurality of pixels and the object data is characterized by at least one color component; (b) snapping the determined maximum tone density level based on a quantization level of a rendering device; and (c) rendering the plurality of pixels of the object with the color component at the snapped tone density level. The exemplary method may further comprise the steps of: (d) determining a median tone density level of a color component of the plurality of pixels of the object data; (e) selecting or generating, based on the determined median tone density level, a halftone pattern having pixels characterized by the color component of the determined median tone density, and wherein the halftone pattern pixels are further characterized by a tone density level based on the determined median tone density level; and wherein the step of rendering the plurality of pixels of the object with the color component having the snapped tone density further comprises rendering a portion of the plurality of pixels of the object with the color component of the determined median tone density according to the selected or generated halftone pattern. In some embodiments, the rendered tone density of the color component having the determined median tone density level may be associated with the selected or generated halftone pattern. Some method embodiments may further include the step of testing whether the snapped tone density level is not supported by the rendering device, and if the snapped tone density level is not supported by the rendering device, then executing the steps of: (a) determining a first device-supported tone density level greater than the snapped tone density level and a second device-supported tone density level less than the determined maximum tone density level; and (b) rendering the object via an application of one or more scan lines comprising the first device-supported tone density level greater than the snapped tone density level and the second device-supported tone density level less than the snapped tone density level. Some method embodiments may further include the step of testing of the object data characterized by three color components, each color component associated with a tone density level, whether the tone density level of each of the three color components of the object data are within a test range of tone density levels, relative to one another, and if true, executing the steps of: (a) determining a tone density level of a black component based on the three color density levels, and (b) assigning the determined tone density level of the black component as the determined maximum tone density level of a color component of the object comprising a plurality of pixels characterized by at least one color component. These method embodiments may also include additional testing as to whether the snapped tone density level is not supported by the rendering device, and if not supported by the rendering device, then executing the steps of: (d) determining a first device-supported tone density level greater than the determined maximum tone density level and a second device-supported tone density level less than the determined maximum tone density level; and (e) rendering the object via an application of one or more scan lines comprising the first device-supported tone density level greater than the snapped tone density level and the second device-supported tone density level less than the snapped tone density level.

Another example of a method embodiment of multilevel tone density rendering comprises the steps of: (a) determining a maximum tone density level of a color component of an object comprising a plurality of pixels characterized by at least one color component; and (b) testing whether the determined maximum tone density level is not supported by the rendering device, and if not supported by the rendering device, then executing the steps of: (1) determining a first device-supported tone density level greater than the determined maximum tone density level and a second device-supported tone density level less than the determined maximum tone density level; and (2) rendering the object via an application of one or more scan lines comprising the first device-supported tone density level and the second device-supported tone density level less than the snapped tone density level. The exemplary method may further comprise the steps of: (c) determining a median tone density level of a color component of the plurality of pixels of the object; (d) selecting or generating, based on the determined median tone density level, a halftone pattern having pixels characterized by the color component having the determined median tone density, wherein the halftone pattern pixels are characterized by a tone density level based on the determined median tone density level; and (e) wherein the step of rendering pixels of the object with the color component having the snapped tone density further comprises rendering a portion of the pixels of the object with the color component having the determined median tone density according to the selected or generated halftone pattern. The rendered tone density of the color component having the determined median tone density level of the exemplary method embodiment may be associated with the selected or generated halftone pattern. The steps of the exemplary method embodiment may further include: (f) testing of the object data characterized by three color components, each color component associated with a tone density level, whether the tone density level of each of the three color components of the object data are within a test range of tone density levels, relative to one another, and if true, then executing the steps of: (1) determining a tone density level of a black component based on the three color density levels, and (2) assigning the determined tone density level of the black component as the determined maximum tone density level of a color component of the object comprising a plurality of pixels characterized by at least one color component.

Image processor embodiments of the present invention that are operative to render, in a multilevel fashion, objects may include: (a) a rendering subsystem and (b) a processing module comprising a processor and addressable memory, adapted to receive object data comprising three color components, each color component having an associated tone density level, the processing module further comprising: (1) a three-color comparator adapted to output the largest of the three tone density levels and the median of the three tone density levels; (2) a gray level snapping module adapted to quantize the largest of the three tone density levels; (3) a halftone generator adapted to provide a halftone cell pattern based on the median tone density level; and (4) a halftoner adapted to render the color component associated with the median tone density level according to the generated halftone cell pattern. The exemplary image processor embodiment may further comprise (5) a scan line toner module adapted to receive at least one of the snapped tone density level or the largest tone density as an input level, and further adapted to determine a first device-supported tone density level greater than the input level and a second device-supported tone density level less than the input level and render the color component associated with the largest tone density of the object via an application of one or more scan lines comprising the first device-supported tone density level greater than the largest tone density level and the second device-supported tone density level less than the largest tone density level. In addition, a printing apparatus for rendering a color image having color pixels on a sheet or substrate thereof may include a processing module as described by example above for the exemplary image processor.

BRIEF DESCRIPTION OF THE DRAWINGS

Embodiments of the present invention are illustrated by way of example and not limitation in the figures of the accompanying drawings, and in which.

DETAILED DESCRIPTION

Figure 1B:
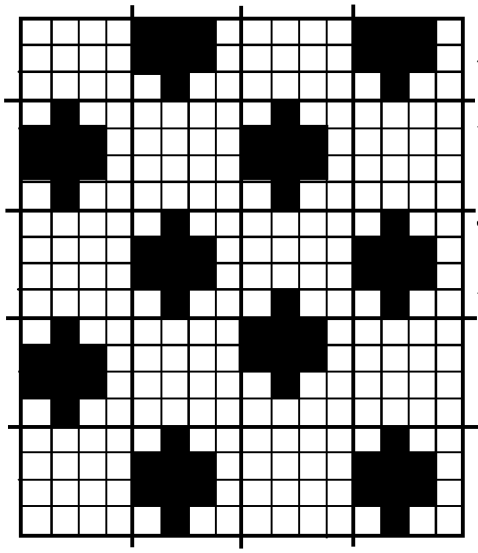
FIG. 1B shows an example of a conventional halftone pattern for a 25% gray level of the color fill.

The smallest region of applied pigmentation to a surface may be termed a dot or pixel. The arrangement of pixels may be in lines where the number of lines running laterally to one another may be used to define a linear density of pigmentation. The granularity of pigmentation of a surface, that is its linear density of pigmentation of color fill, may be expressed in dots per inch (dpi) and pixels per inch. The resolution of a halftone screen may be expressed in lines per inch (lpi) which is the number of line of dots or pixels per one inch as measured in parallel with the angle of the screen. So for example, a laser printer having a resolution of 600 dpi may have a halftone screen resolution of 85-105 lpi. Where the pixels may be expressed as squares, a square matrix may be configured having an equal number of rows of pixels as columns of pixels. The pixels or square matrix may be pigmented in order to express a portion of a rendering. When a rendering device is capable of only one level of pigmentation, for example, black renderings having the appearance of gray may be produced by withholding the application of pigment to less than the entire number of pixels in a matrix that would otherwise receive pigmentation if black was the desired color of appearance as the color fill. A technique for applying the withholding of pigmentation to achieve a desired level of gray is a halftone cell. A halftone cell may be a matrix of two pixels by two pixels or greater. For example, a two-by-two halftone cell pattern may be configured so that three levels of gray may be perceived between a white surface within the matrix and a black rendering, where all four pixels within the matrix are pigmented. By allowing one, two, or three pixels to be pigmented in a case where a black rendering would invoke pigmenting of all four pixels, a halftone cell provides for the perception of gray level. In similar fashion, a four-by-four halftone cell pattern may be configured so that fifteen levels of gray may be perceived and an eight-by-eight halftone cell pattern may be configured so that sixty-three halftone cell patterns may be configured. A halftone cell pattern may function as a screen where a graphic object such as a font, quantized into an array or matrix of pixels, may have one or more pixels that do not coincide with pixels allowing pigmentation or toning according to the halftone pattern applied to reflect the desired gray level. Accordingly, these one or more pixels will not be rendered in pigment. The finer and lighter in gray level the object is to be rendered by a printing device, the more likely a portion of its pixels will not be rendered as the gray level desired moves further from black toward the non-pigmented or non-toned.

A page description language (PDL) specifies the arrangement of a printed page through commands from a computer that the printer executes. For high density dpi rendering devices, a PDL interpreter may render black fonts, text, and line art in a level set at 1-bit, i.e., black, or non-pigmented, per pixel, in an attempt to print with optimized speed. For gray fonts and line art, a halftone pattern may be applied, as described above, where a pattern of black and non-pigmented pixels is used to visually approximate a level of gray. For lighter colors and/or a visually approximate blending of colors for fonts and line art, the halftone patterns may be applied as well. By precluding the pigmenting of pixels, the pattern applied to fonts and line art greatly affects the rendered pixels when lighter tones are executed.

Figure 1D:
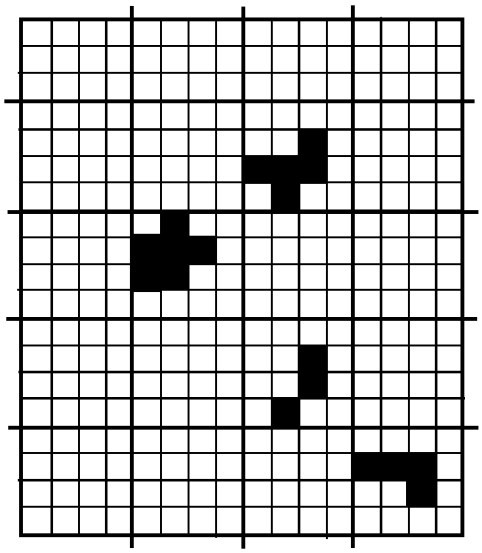
FIG. 1D shows an example of the output of a 25% gray level.
Figure 1A:
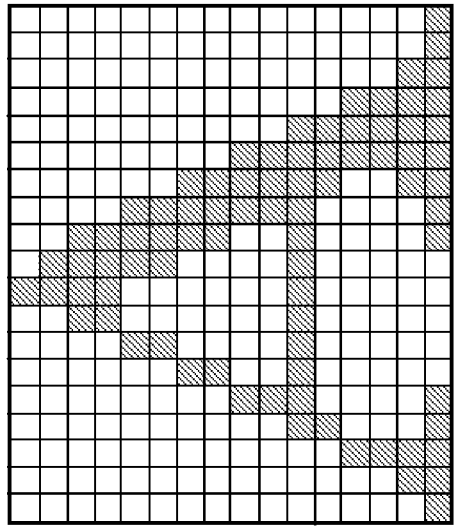
FIG. 1A shows an example of a scaled source data at device resolution prior to rendering a color fill.
Figure 1C:
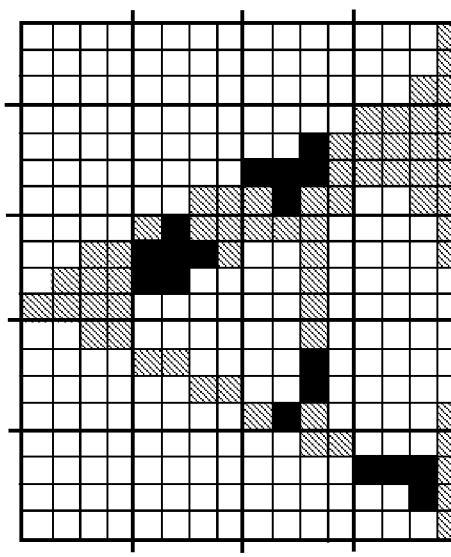
FIG. 1C shows an example of the output of overlapping pixels for a conventional 25% gray level.

FIGS. 1A-1D show prior art exemplary pixel matrices pertaining to the rending of a 25% gray letter "A," i.e., 75% lighter than the fully pigmented or fully toned "A" within a matrix. FIG. 1A illustrates a scaled source data at device resolution prior to the steps pertaining to a rendering, such as a color fill. FIG. 1B illustrates a conventional halftone pattern for a 25% gray level that may be applied to approximate the gray level, i.e., the lightness, of the color fill where each "on" pixel is of the darkest tone density level for the printing device. FIG. 1C illustrates the pixel-by-pixel intersection of the scaled source and the halftone pattern where it will be the overlapped pixels that will show on the output. FIG. 1D illustrates the rendered output of "A." Due to the conventional halftone pattern for a 25% gray level, portions of the font that lie in the portions of pixels remain without pigment or colorant but contain visual information that may be necessary to discern the character which, albeit unrecognizable, may be perceived being lighter in color.

Figure 2A:
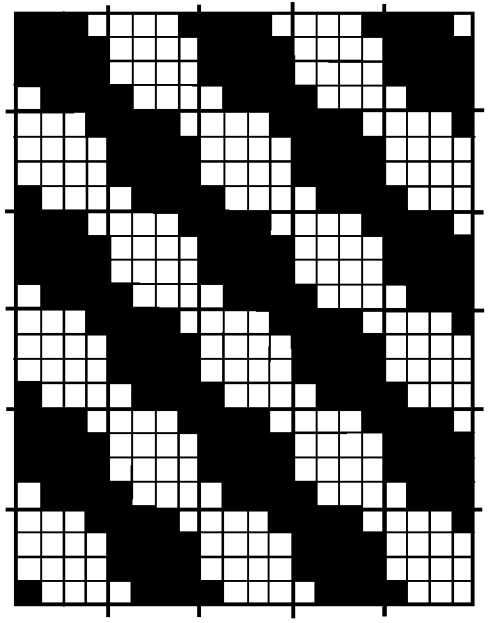
FIG. 2A shows an example of a scaled source data at device resolution before a color fill.
Figure 2B:
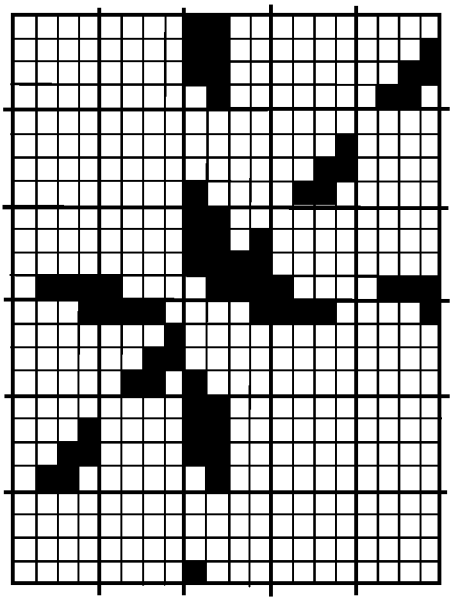
FIG. 2B shows an example of a conventional halftone pattern for a 50% gray level of the color fill.
Figure 2C:
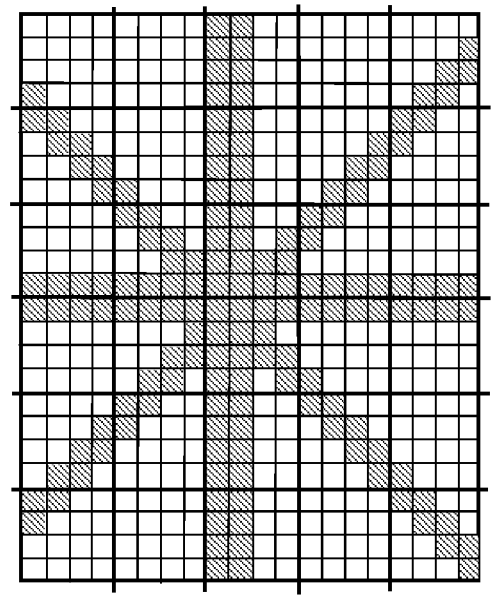
FIG. 2C shows an example of the overlapped pixels for a conventional 50% gray level.
Figure 2D:
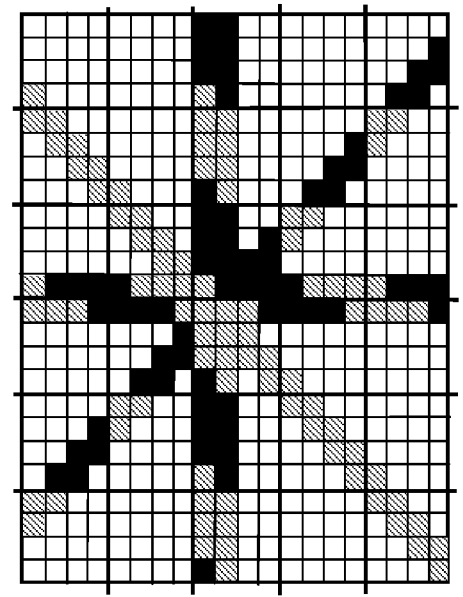
FIG. 2D shows an example of the rendered output of lines for a conventional 50% gray level.

FIGS. 2A-2D illustrate prior art examples of line art having 2-pixel-wide lines when the color is to be expressed at a 50% gray level, i.e., 50% lighter than the fully pigmented or fully toned "A" within a matrix. FIG. 2A shows the scaled source data in device resolution right before color fill. FIG. 2B shows a conventional halftone pattern for a 50% gray level that may to be applied to approximate the 50% gray level, i.e., the lightness, of the color fill. FIG. 2C illustrates the overlapped pixels that will show as pigmented on the rendered output. FIG. 2D illustrates the rendered output of lines where one may note a missing line of the line art where the source image (FIG. 2A) missed the halftone orientation (FIGS. 2B and 2C).

When the rendering device is capable of two or more levels of pigmentation or tone density per pixel, the multi-level pigmentation, or multilevel toning, provides another degree a freedom to the spatial arrangements of halftone cell patterns. For instances where multi-level pigmentation is available, a halftone pattern may be applied to achieve visual approximations of gradations between these levels and halftones patterns such as those of FIGS. 1B and 2B may preclude legible renderings of fonts and line art at the lighter levels of pigmentation.

The method embodiments of the present invention may be arranged in sub-processes that may be executed serially, separately, and by various combinations and may be executed as steps by one or more processing units as machine readable instructions. The method embodiments may be tuned to particular device-specific implementations and accordingly incorporate the multi-level output capability of the hosting device. Method embodiments of the present invention may be implemented via a PDL print controller, e.g., an integrated print system (IPS). More particularly, the method embodiments of the present invention may be applied in device-dependent designs for gray level handling between input color and output pattern and also the steps of the method may be integrated in an overarching processing method that includes special-designed font halftoning. A first sub-process includes the quantized rounding, or snapping, of a desired gray level to a level that the target device can render. A second sub-process includes the filling scan lines with two or more different gray levels to achieve a visually average gray level. A third sub-process includes manipulating color separations.

Snap to Primary Gray Levels

While a black or white rendering of a pixel may be expressed as 1-bit output, a multilevel output may expressed as m-bit output where m has the value of two or more. For example, an electrophotography engine (EP) that is capable of 4-bit output for an isolated pixel may be described as ideally having sixteen density levels: from level zero through level fifteen. Of course, it is the density of the tone on the printed paper that is of interest for visual perception. 2-bit and 4-bit output devices are the most numerous of the multi-bit devices. For a 4-bit device, the engine can print 15 different gray levels for each color channel. For a 2-bit device, the engine can print 3 different gray levels for each color channel. These printable gray levels are called primary grey levels in this invention. When rendering the font, the color to be filled will be snapped to one of the available primary grey levels. Therefore, instead of filling a halftone pattern, a solid area will be filled with one of the primary gray levels.

Figure 3:
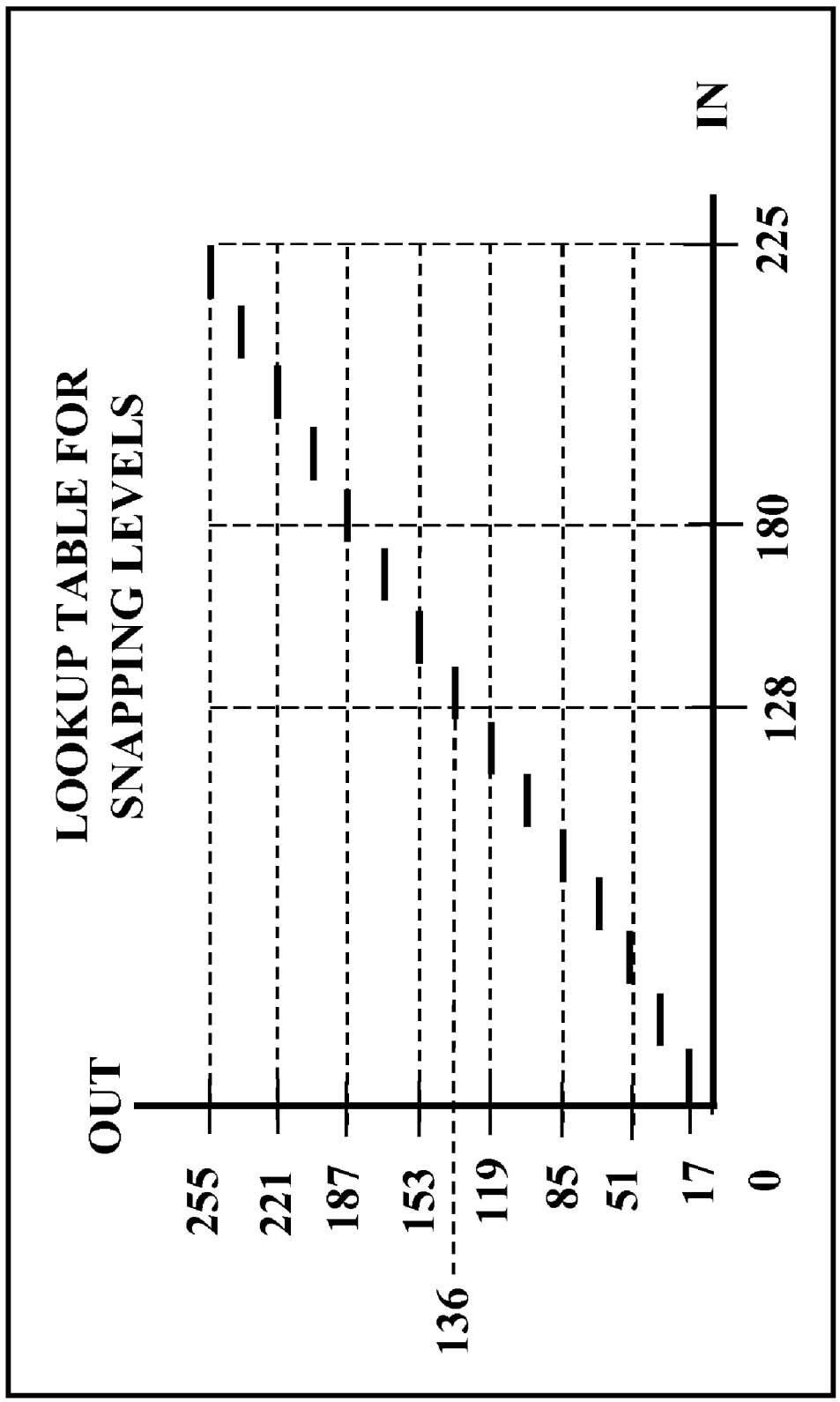
FIG. 3 is a graphical depiction of an exemplary lookup table that may be applied in the biased quantization or snapping embodiments of the present invention.
Figure 5:
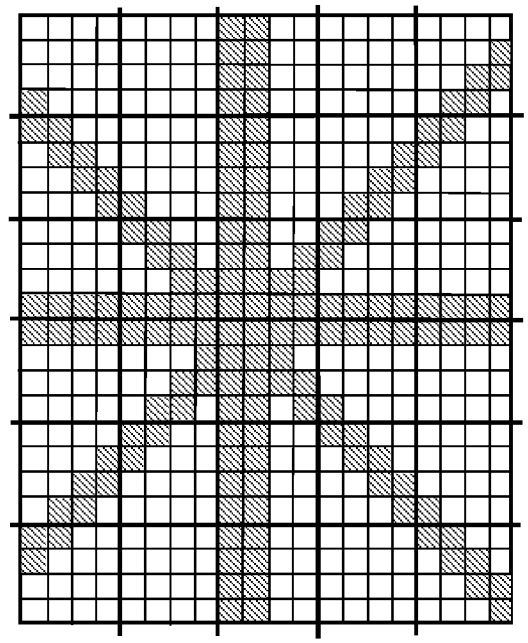
FIG. 5 is an example of the object of FIG. 2A having pixel tone densities snapped according to an embodiment of the present invention.
Figure 4:
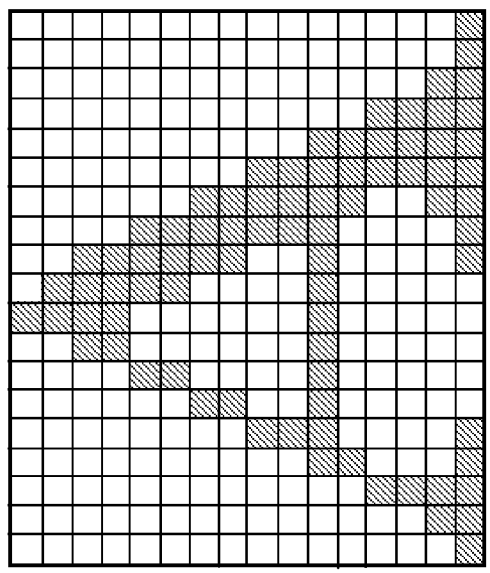
FIG. 4 is an example of the object of FIG. 1A having pixel tone densities snapped according to an embodiment of the present invention.

For purposes of example, a linear tone curve may be used for a 4-bit device where the output levels in the scale of 255, i.e., an 8-bit scale represented via a 4-bit scale, might be device-specific output levels comprising the primary gray levels: 17, 34, 51, 68, 85, 102, 119, 136, 153, 170, 187, 204, 221, 238, and 255. An input level of 180 (8-bit) may be rounded, or bias-quantized, or snapped to the closest value of output level: 187 (8-bit) for the exemplary device, i.e., the 4-bit device, having 15 levels of tone. There are several methods of executing a "snapping" function which may include offset quantization methods and may include making reference to a mapping look-up table (LUT). FIG. 3 shows an example of such a LUT. Referring to the 25% grey level of the font of FIG. 1A depicting the letter "A," rather than the application of the halftone pattern such as that of FIG. 1B, the application of a look up table may "snap" the 25% grey level which is an output level of 64 (8-bit) by way of mapping the 64 to an device-specific output level 68 (8-bit). In reviewing the exemplary lookup table of FIG. 3, one may note that an input level of 128 is rounded up, or snapped, to an output level of 136 and an input level of 180 is snapped to a level of 187. The pixels that comprise the font are then rendered at the device-specific tone level of 68. FIG. 4 illustrates the font rendered according to the snapping of the 25% grey level of the font of FIG. 1A to a device-specific gray level of 68. Referring to the 50% grey level of the scaled data depicting the asterisk-like object of FIG. 2A, rather than the application of the halftone pattern such as that of FIG. 2B, the application of a look up table may "snap" the 50% grey level which is an output level of 128 (8-bit) by way of mapping the 128 to a device-specific output level 136 (8-bit). The pixels that comprise the object are then rendered at the device-specific tone level of 136. FIG. 5 illustrates the font rendered according to the snapping of the 50% grey level to a device-specific gray level of 136.

A method of down-sizing the 255 (8-bit) levels to 15 (4-bit) levels may be to round-up, i.e., to apply biased quantization. For example, for a particular color tone level at the 8-bit level, x, the device-specific output level, at the 4-bit level, y, may be expressed as:

$$y=(x+8)/17.$$

Mindful of the almost logarithmic response of the human visual system to increasing intensity, one may apply a compensation function to the rounded-up values. That is, after the rounding-up step, an EP engine tone curve correction may be applied to increase the tone density for the light levels and decrease the tone density for the dark levels. Exemplary corrections may be level-by-level, piecewise linear across two or more levels, or may follow in part or in total a power-law transformation, where z is the corrected EP engine tone level, y is the device specific output level from the rounding-up step, and both c and $\gamma$ are positive constants and $\epsilon$ may be applied as a bias. For example:

$$z=c(y+\epsilon)^\gamma.$$

The exemplary corrections may be built into a lookup table, such as the one illustrated by example in FIG. 3.

Dual-Level Patterns

Figure 6A:
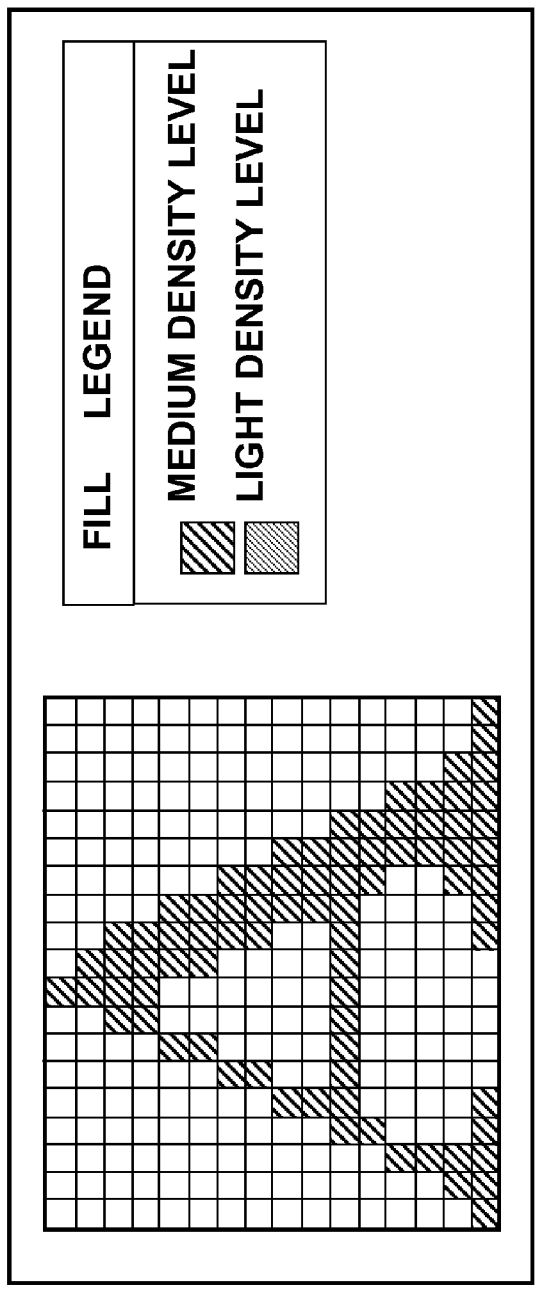
FIG. 6A is an exemplary depiction of an object having all toned pixels rendered at a medium density level for an embodiment of the present invention.
Figure 6B:
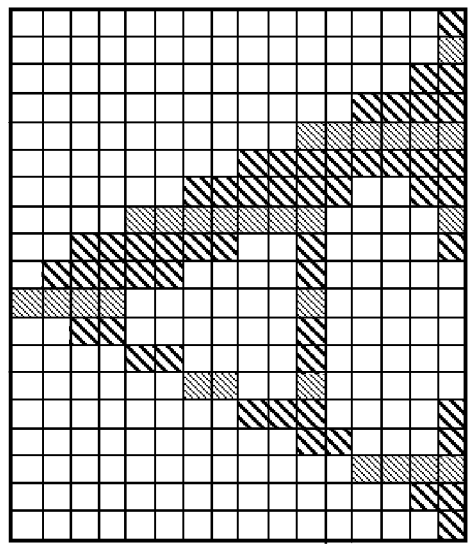
FIG. 6B is an exemplary depiction of an object having columns of toned pixels rendered at a medium density level and columns of toned pixels rendered at a light density level for an embodiment of the present invention.
Figure 6D:
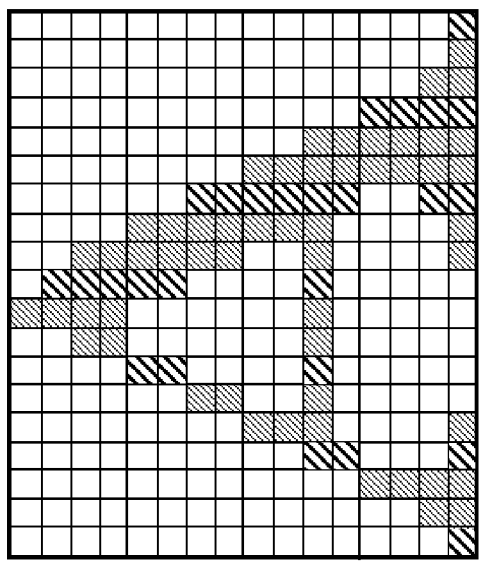
FIG. 6D is an exemplary depiction of an object having columns of toned pixels rendered at a medium density level and columns of toned pixels rendered at a light density level for an embodiment of the present invention.
Figure 6E:
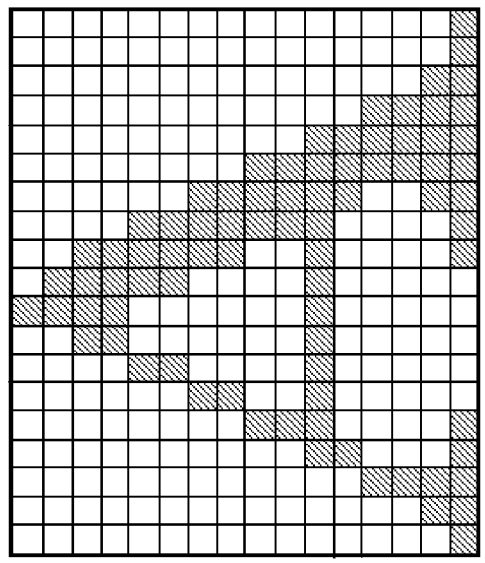
FIG. 6E is an exemplary depiction of an object having all toned pixels rendered at a light density level for an embodiment of the present invention.
Figure 6C:
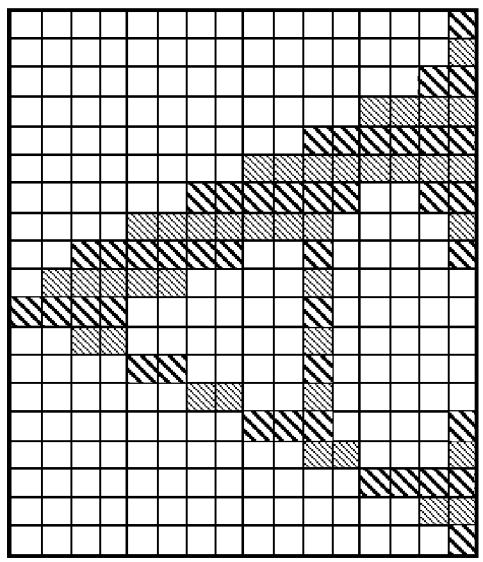
FIG. 6C is an exemplary depiction of an object having columns of toned pixels rendered at a medium density level and columns of toned pixels rendered at a light density level for an embodiment of the present invention.

As described above for a 1-bit device, halftone patterns may be applied to produce a visually perceived average of toned pixels that has the appearance of an intermediate gray level. An EP device that is also a 2-bit output device may print at no more than three tone densities, i.e., gray levels. In order to extend the visually perceived average of toned pixels that have the appearance of intermediate levels between the three gray levels, one may apply dual-level patterns having fill patterns according to different scan lines having tone levels drawn, in the case of a 2-bit out device, from one of the three available gray levels, e.g., a dark level, a medium level and a light level of gray. So, for a 2-bit output device, the object may be output at three levels where the object is rendered having homogenous pixel density tones. For purposes of illustration, scan lines may be depicted as columns of a matrix of pixels. For example, FIG. 6A shows the letter "A" in a font depicted entirely at the medium gray level, i.e., the medium tone density for a device. FIG. 6E shows the letter "A" in a font depicted entirely at the light gray level, i.e., the lightest of the three tone densities for a device. FIG. 6B shows the letter "A" in a font depicted as a combination of columns of pixels, or scan lines, having the medium level of gray and a few, i.e., six of nineteen columns, having the light level of gray. FIG. 6D shows the letter "A" in a font depicted as a combination of columns of pixels that have the light level of gray and a few, i.e., seven of nineteen columns, having the medium level of grey. FIG. 6C shows the letter "A" in a font depicted as a combination of columns of pixels having the medium level of grey and about the same, i.e., nine of nineteen columns, having the light level of gray. Accordingly, the visually perceived average of each of the scan line depictions of FIGS. 6B-6E provide for three intermediate gray levels between FIGS. 6A and 6D. In likewise fashion, three additional gray levels may be depicted between the letter "A" in a font depicted entirely at the medium gray level and the letter "A" in a font depicted entirely at the dark gray level by combinations of scan lines where each scan line is selected from either the medium gray level or the dark gray level depending on the average perceived level of gray desired for the font. Accordingly, this example of dual-level patterns having fill patterns according to different scan lines having tone levels drawn, in the case of a 2-bit device yield at least nine perceived, i.e., visually averaged, levels of gray. In the case of a 4-bit device, the depiction of the letter "A" via a composition of pixels drawn exclusively from the same level of the device-supported gray levels may generate a font having homogenously toned pixels at one of 15 levels of gray. Allowing for at least three visually average or perceived levels of gray via the scan line method described for the 2-bit device, one may note that there are 42 additional gray levels that may be generated levels for a total number of gray levels of 57. For both the 2-bit and 4-bit exemplary devices, one may generate additional combinations of scan lines drawn from two gray levels to produce additional average perceived levels of gray. The frequency of the two levels may be chosen toward a higher level to enhance the renderings of complex and fine fonts and the ratio of the two levels may be in proportion to the perceived tonal distance between two homogeneous levels that may be interpolated based on the tone density level of the object to be rendered.

Color Separation Manipulation

Commercial use of an original logotype, or logo, to identify the source of goods and/or service may generate goodwill in that logotype. If the logotype includes colors other than black and white, it is often preferred by the owner of the logotype that the logotype be rendered having colors and shapes that are consistent with the original logotype. Output shapes and edges may be rendered via manipulations of color separation to address the font and line art rendering quality. An exemplary method may be embodied using particular halftones for fonts where some manipulations of color separations may be considered to address the output shape/edges. For example, the color components of each pixel of a font may be expressed as tone density levels, or color channels, of cyan, magenta, yellow, and may include black. An exemplary method comprises: (a) testing whether the color density levels of cyan, magenta, and yellow are substantially equal and if not then (b) determining the maximum density level of color channel from the cyan, magenta, and yellow components; (c) snapping the maximum density level color channel; and (d) halftoning to render the color having the largest density color level, other than the color having the determined maximum density level color level.

Figure 7:
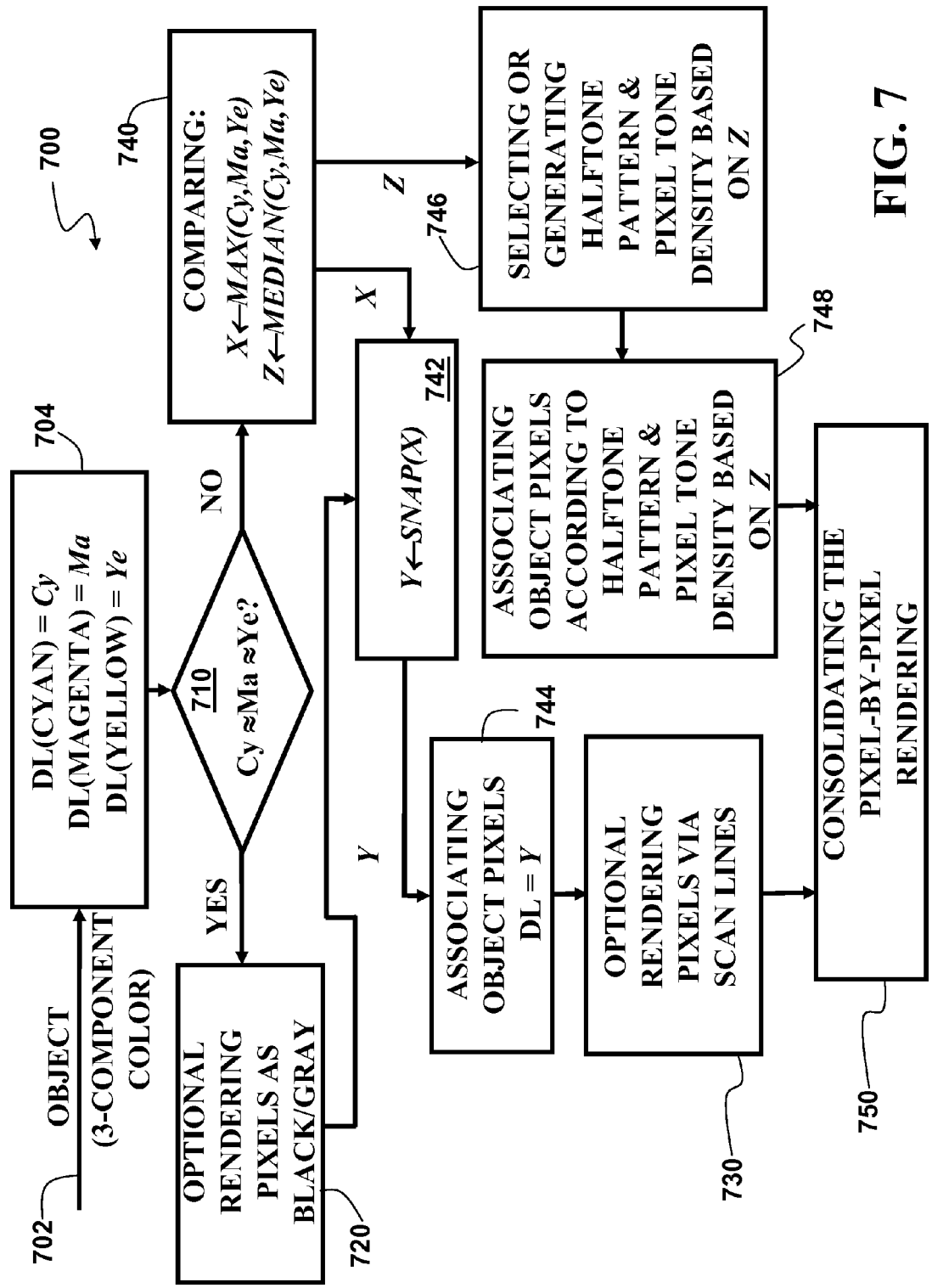
FIG. 7 is an exemplary high level flowchart illustrating a method embodiment of the present invention.

FIG. 7 is a top level flowchart 700 of a method embodiment of the present invention where an object 702 may be expressed via multiple pixels where each pixel may be expressed via three-component colors. The tone density level of the of the cyan component, DL(cyan), may be expressed 704 as Cy, the tone density level of the magenta component, DL(magenta) may be expressed as Ma, and the tone density level of the yellow component, DL(yellow) may be expressed as Ye. If the tone density levels of the cyan, magenta, and yellow components for the object are approximately equal (test 710), i.e., Cy≈Ma≈Ye, then the color components may be rendered for all of the pixels of the object at equal tone density levels according to the quantization levels of the rendering device, or if black is an available component, then the color components may be rendered as black or a level of gray for all of the pixels of the object (step 720). A sub-process step of dual level of scan lines (step 730) may be applied to extend the range of visually averaged gray depending on the tone levels available to the printing device. In some embodiments, the snapping step may be optional, for example, as may be the case with 2-bit rending devices, and their dual level scan lines rendering (step 730) that may be applied to achieve a visually averaged result comparable to a snapped result of a 4-bit device. The range defining the tone levels that may be used to test for color density levels being approximately equal may be device dependent. If the tone density levels of the cyan, magenta, and yellow components are not approximately equal for the object (test 710) and at least two of the tone density levels are non-zero, then comparisons of the three tone density levels may be made (step 740): (a) the color component having the largest tone density level may be snapped (step 742) to an adjusted tone density output level and all the pixels of the object may be assigned (step 744) the color component having the adjusted tone density output level associated with them and (b) the color component having the median or next largest tone density level may be associated with some of the pixels of the object according to a selected or generated halftone pattern (step 746) where the tone density level of the median color component of the halftoned pixels (step 748) may be adjusted according to a tone density level determined for the selected or generated halftone pattern. As in the optional case of levels of gray to black rendered via scan lines, if the device does not support a rounded or snapped tone density level (steps 742 and 744), the nearest two supported tone levels may be applied via the sub-process dual levels and scan lines (step 730) to render, in part, a visual average of the color component having the largest tone density level. If the object is not being rendered in a gray to black range of color, then a consolidating (step 750) of the rendering may include combining the snapped density tone level, or the dual level scan lines, of the component having the largest initial density tone level with the "on" pixels of the halftoned component having the median initial density tone level.

Figure 8A:
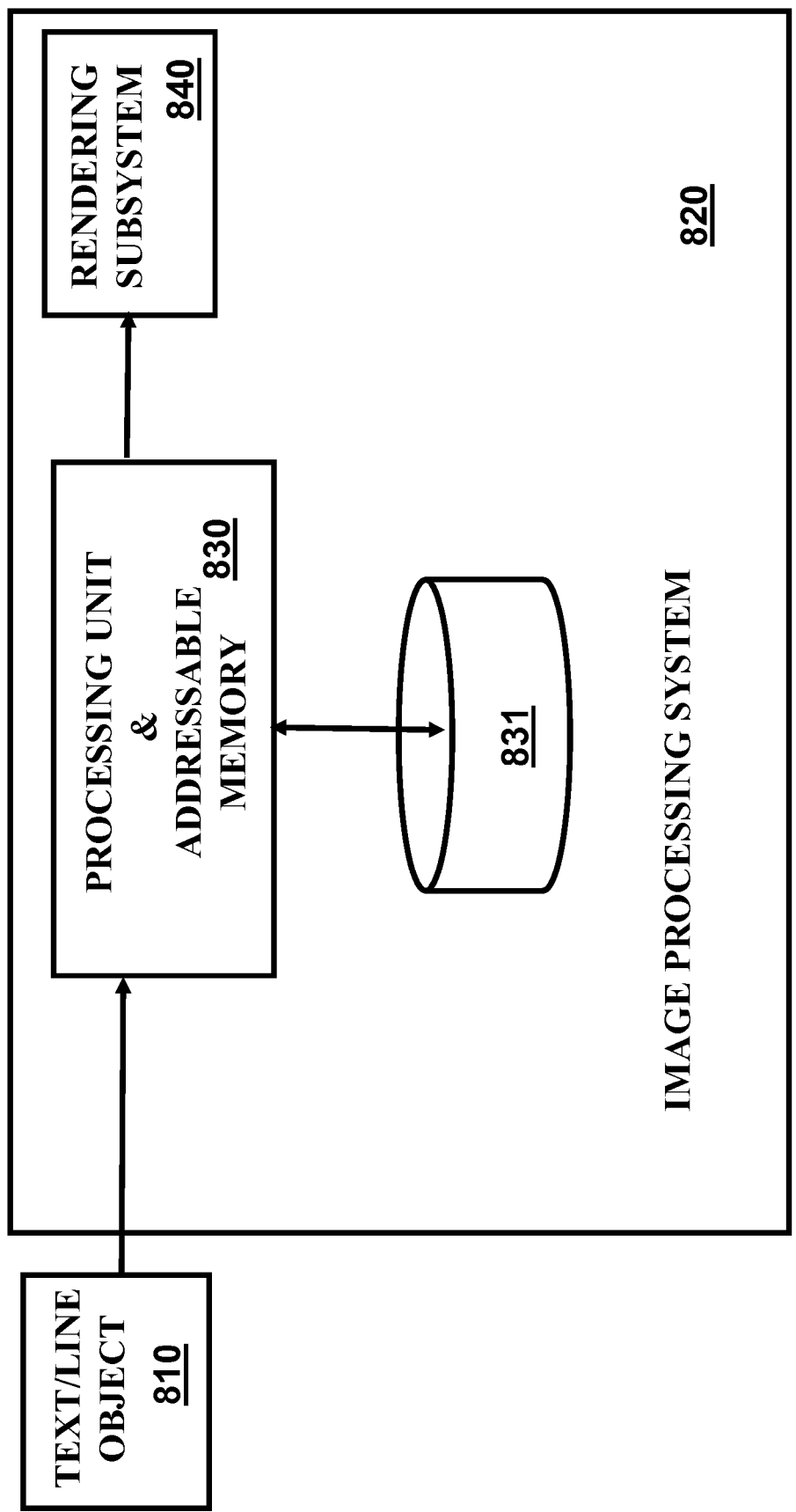
FIG. 8A is an exemplary high level functional block diagram illustrating an apparatus embodiment of the present invention.
Figure 8B:
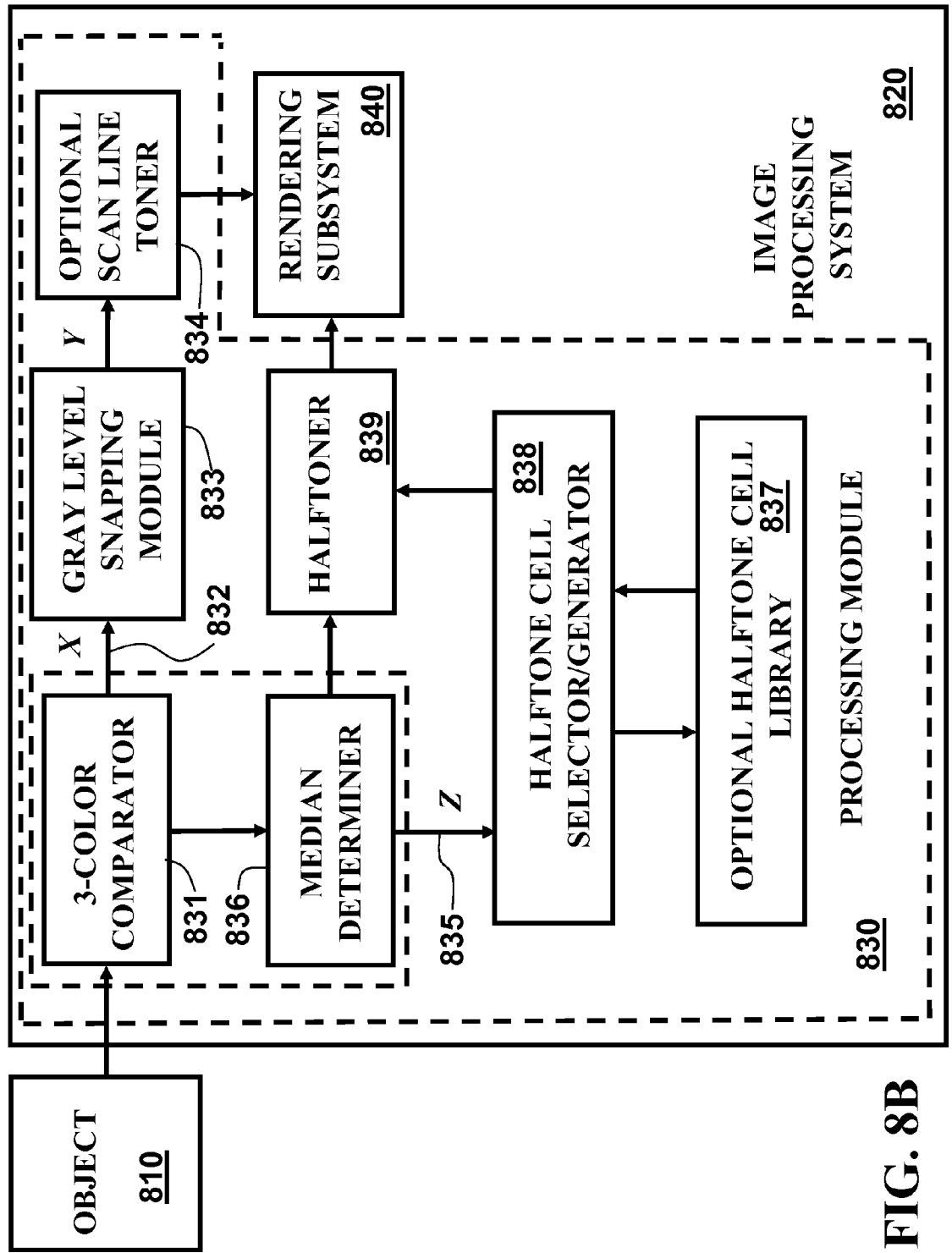
FIG. 8B is an exemplary intermediate level functional block diagram illustrating an apparatus embodiment of the present invention.

An apparatus or device embodiment of the present invention may be described generally according to the top level functional block diagram of FIG. 8A. The test/line object 810 is input to an image processing system 820 where the image processing system comprises a rendering subsystem 840 and processing unit having addressable memory 830 that may include a memory store 831 or library of halftone patterns and a lookup table. e.g., the exemplary lookup table as graphically depicted in FIG. 3. Some of the apparatus or device embodiments of the present invention may be described in greater detail according to the intermediate level functional block diagram of FIG. 8B. Functional blocks of the processing unit 830 may be executed as modules of instructions embodied as machine readable code and/or may be embodied as separate sub-processing modules each having a separate sub-processing unit, the modules being federated or operating in cooperation so that the processing unit 830 may also be described as a processing system within the image processing system 820. A three-color comparator 831 may take in the tone density levels of each color component associated with the object 810, identify the component having the largest tone density level and pass the component having the largest tone density level 832 for rendering at tone level according to a gray level snapping or rounding module 833. In the event that the 3-color comparator determines the three tone density levels to be approximately equal, a black component for rendering may be used and the gray level may be snapped or rounded via the gray level snapping module 833. If the printing device does not support the snapped gray level, a scan line toner scan line toning module 834 may be invoked to render two levels gray near the snapped gray level, and does so in columns or scan lines. The option scan line toner may be invoked for the snapped color component, for example, if that adjusted level is not supported by the device. The three-color comparator may also determine the color component having the median tone level or a determined median tone level 835 may be output with its associated color component from a median determiner 836. Based on the median tone level 835, a halftone cell pattern may be selected from a library 837 or generated 838 having a tone level for the "on" pixels to be applied via a halftoner 839. Then a rendering subsystem 840 of the image processing system 820 may then consolidate the snapped color component with the haftoned color component to render the object.

Figure 9A:
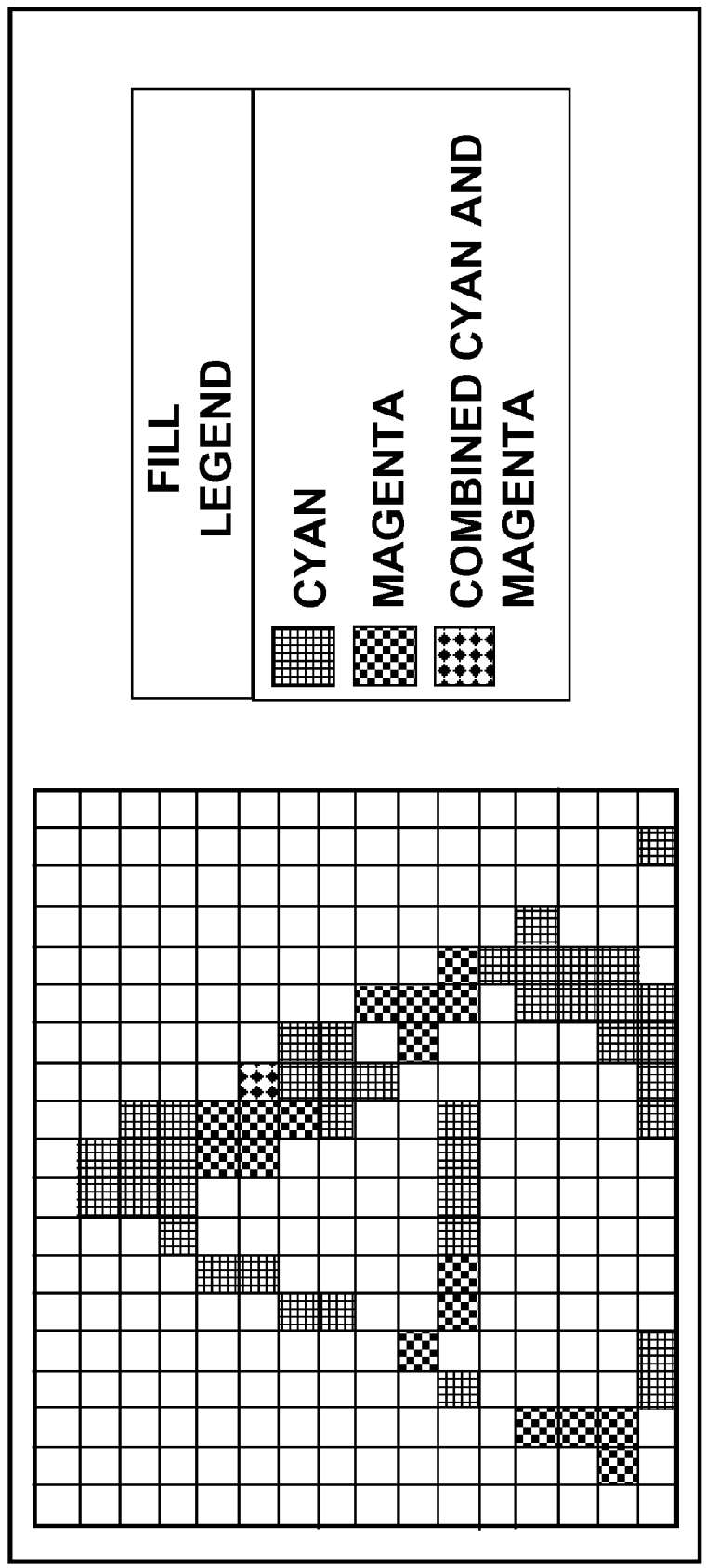
FIG. 9A illustrates an object having three color components rendered by halftones.
Figure 9B:
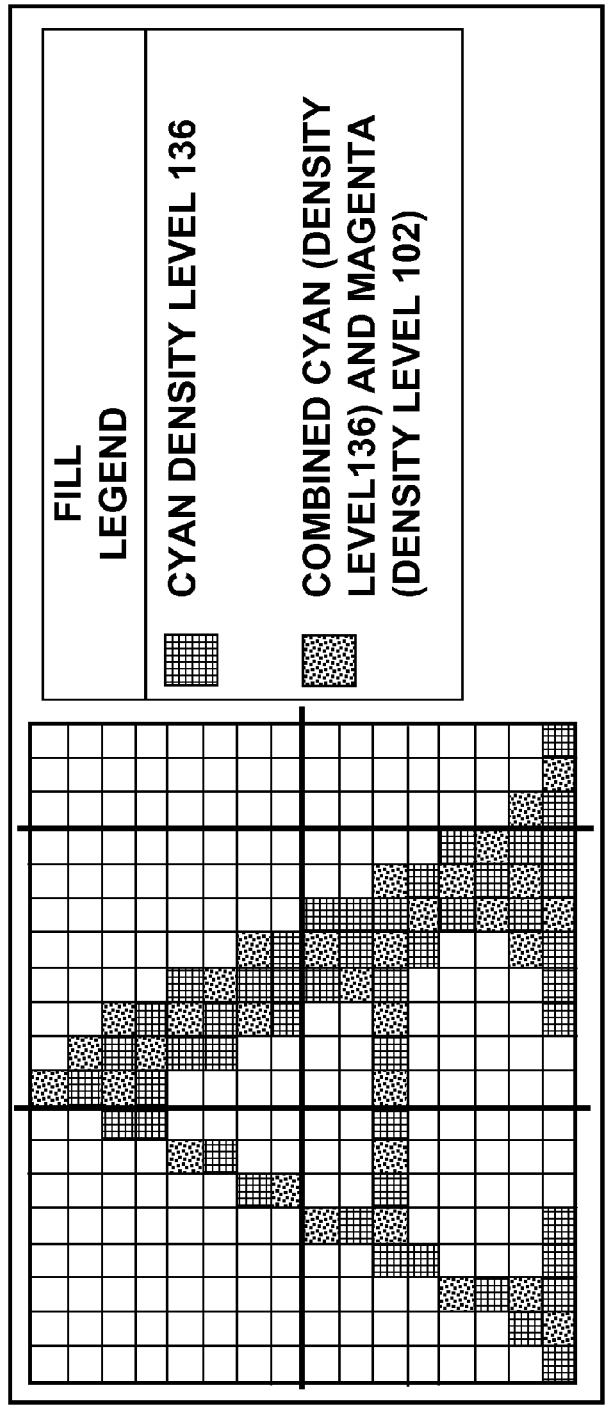
FIG. 9B illustrates an object having three color components rendered via an embodiment of the present invention.
Figure 9C:
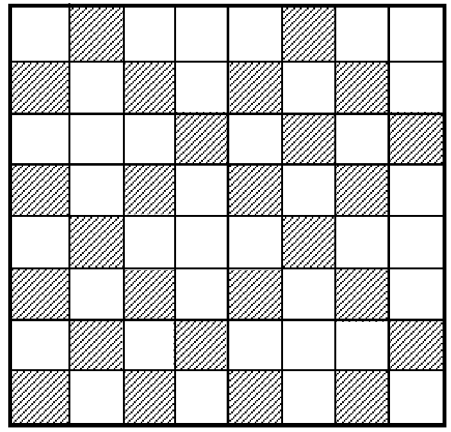
FIG. 9C illustrates an exemplary halftone cell pattern that may be applied to a medium color component according to an embodiment of the present invention.

FIG. 9A shows an example of the results of the application of a conventional halftone output for the letter "A" having the font shape as depicted for example in FIG. 1A where the 8-bit color density level of cyan is 128 and the 8-bit color level for magenta is 64, and where the 8-bit color density level of yellow is zero. Applying the process steps of the method embodiment for color separation manipulation would have an apparatus first determine that the color levels for cyan, magenta and yellow were not approximately equal. The maximum color or tone density level is the cyan at 128. Snapping the cyan color density level for an 8-bit rendering may be accomplished by rounding x up where the snapped density level value is y=(x+8)=128+8=136. Since the yellow color level in this example is already zero, there is no step, or inherent step, of suppressing the least of the three color levels. As for the median color component which is magenta in this example, a special halftone pattern is selected or generated. In this example, FIG. 9C shows an 8 pixel-by-8 pixel pattern when the (8-bit device) gray level is 64 in which each "on" pixel, i.e., pixel having tone, has a density level of 102. The color density level of 102 may be the minimal stable pixel density for a 4-bit rendering. In this example, the color density level of 64 for magenta may be applied via the special halftone pattern of FIG. 9C. That is, of the 64 pixels in the halftone cell pattern of FIG. 9C, 26 pixels are "on" pixels at a color density level 102 which provides a visual average level of 40%, where a density level of zero is 0% and a density level 255 is 100%. Accordingly, FIG. 9B shows the letter "A" having pixels toned with magenta at density level 136 and some of those pixels, according to the special halftone pattern, also toned with cyan at color density level 102.

Figure 10C:
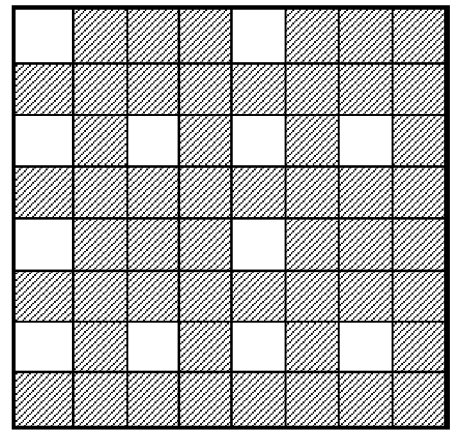
FIG. 10C illustrates an exemplary halftone cell pattern.
Figure 10A:
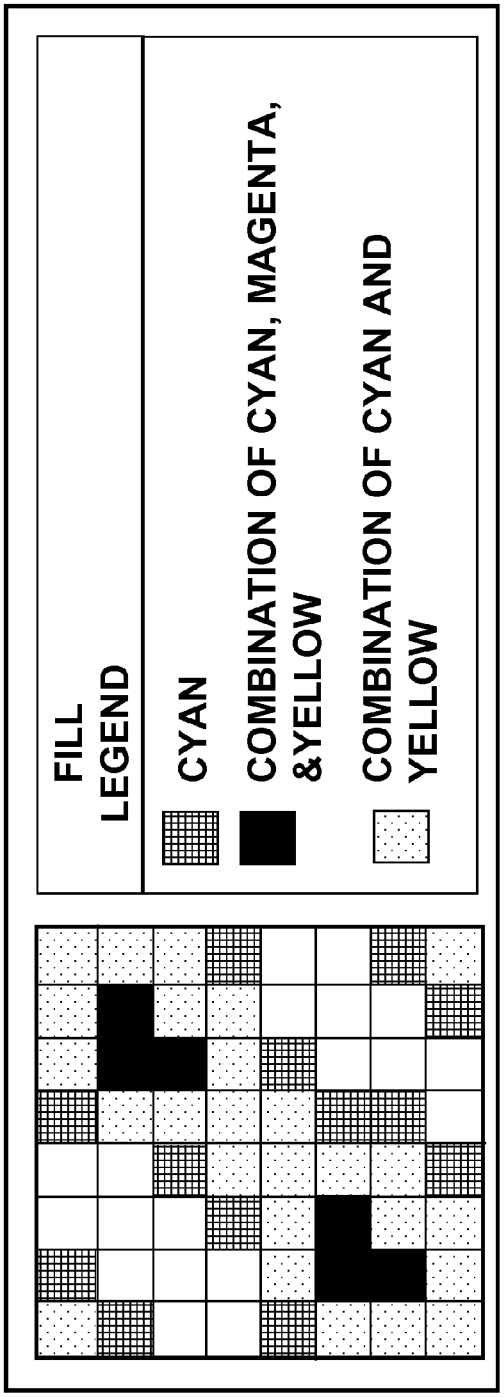
FIG. 10A illustrates a pixel matrix having three color components rendered by halftones.
Figure 10B:
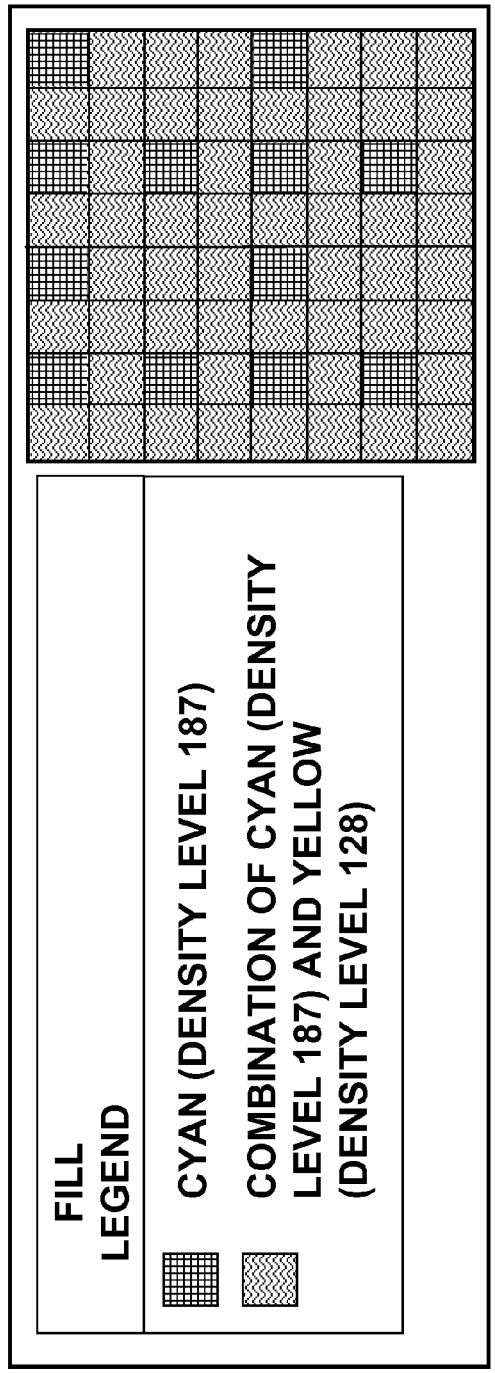
FIG. 10B illustrates a pixel matrix having three color components rendered by an embodiment of the present invention.

To illustrate the method of color separation manipulation where all three elements of a 3-component color are non-zero, an 8-by-8 matrix of pixels may be described where the desired visual average of the 64 pixels is to be that of a single pixel having a color density level of cyan at 180, a color density level of magenta at 25 and a color density level of yellow at 128. Applying conventional halftones for each color yields FIG. 10A which attempts to achieve the average visual appearance of a matrix of pixels each having the same three color density levels of 180 for cyan, 25 for magenta, and 128 for yellow. One may note that several pixels are "off" or non-toned and for finer fonts, may result in non-rendered and unprinted portions. One may apply an exemplary method of the present invention to yield an 8-by-8 matrix of pixels having all pixels "on" or "tones" that also have the average visual appearance of a single pixel having the same or a higher saturated color version of the original three color components. Since the three color density levels are not substantially equal, executing the steps of the exemplary method yields the color density of cyan snapped to 187 (FIG. 3). The color density of magenta is the least of the three and may be set to zero for purposes of rendering. In some embodiments, a second halftone may be applied for the least of the three color density levels. Continuing with the present embodiment, the special halftone similar to the one shown by example in FIG. 9C may then be applied, having 52 "on" pixels, for the color density level of yellow at 156 as shown in FIG. 10C. The result of the application of the exemplary embodiment is illustrated in FIG. 10B where all pixels are toned at the snapped color density 187 with cyan and according to a special halftone such as FIG. 10C, the "on" pixels may be toned with yellow at a density level according to the special halftone pattern commensurate with the original tone density level of 128 for yellow. By this exemplary method, the average visual appearance of the 8-by-8 matrix of pixels is similar to that of a single pixel having the higher saturated color density of 187 for cyan and 128 for yellow.

One of ordinary skill in the art will also appreciate that the modules and functions described herein may be further subdivided, combined, and/or varied and yet still be in the spirit of the embodiments of the invention. In addition, while a number of variations of the invention have been shown and described in detail, other modifications, which are within the scope of this invention, will be readily apparent to those of ordinary skill in the art based upon this disclosure, e.g., the exemplary flowcharts or processes described herein may be modified and varied and yet still be in the spirit of the invention. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

What is claimed is:

1. A method of multilevel tone density rendering comprising:
    determining a maximum tone density level of a color component of an object wherein the object data comprises a plurality of pixels and the object data is characterized by at least one color component;
    snapping, via a mapping look-up table, to a rendering device-specific output level, the determined maximum tone density level based on a quantization level of the rendering device; and
    rendering the plurality of pixels of the object with the color component at the snapped tone density level.

2. The method of multilevel tone density rendering as claimed in claim 1 further comprising:
    determining a median tone density level of a color component of the plurality of pixels of the object data;
    selecting or generating, based on the determined median tone density level, a halftone pattern having pixels characterized by the color component of the determined median tone density, and wherein the halftone pattern pixels are further characterized by a tone density level based on the determined median tone density level; and
    wherein the step of rendering the plurality of pixels of the object with the color component having the snapped tone density further comprises rendering a portion of the plurality of pixels of the object with the color component of the determined median tone density according to the selected or generated halftone pattern.

3. The method of multilevel tone density rendering as claimed in claim 2 wherein the rendered tone density of the color component having the determined median tone density level is associated with the selected or generated halftone pattern.

4. The method of multilevel tone density rendering as claimed in claim 1 further comprising:
    testing whether the snapped tone density level is not supported by the rendering device, and if the snapped tone density level is not supported by the rendering device, then:
        determining a first device-supported tone density level greater than the snapped tone density level and a second device-supported tone density level less than the determined maximum tone density level; and
        rendering the object via an application of one or more scan lines comprising the first device-supported tone density level greater than the snapped tone density level and the second device-supported tone density level less than the snapped tone density level.

5. The method of multilevel tone density rendering as claimed in claim 1 further comprising:
    testing of the object data characterized by three color components, each color component associated with a tone density level, whether the tone density level of each of the three color components of the object data are within a test range of tone density levels, relative to one another, and if true:
(a) determining a tone density level of a black component based on the three color density levels, and
(b) assigning the determined tone density level of the black component as the determined maximum tone density level of a color component of the object comprising a plurality of pixels characterized by at least one color component.

6. The method of multilevel tone density rendering as claimed in claim 5 further comprising:
testing whether the snapped tone density level is not supported by the rendering device, and if not supported by the rendering device, then:
determining a first device-supported tone density level greater than the determined maximum tone density level and a second device-supported tone density level less than the determined maximum tone density level; and
rendering the object via an application of one or more scan lines comprising the first device-supported tone density level greater than the snapped tone density level and the second device-supported tone density level less than the snapped tone density level.

7. A method of multilevel tone density rendering comprising:
determining a maximum tone density level of a color component of an object comprising a plurality of pixels characterized by at least one color component;
testing whether the determined maximum tone density level is not supported by the rendering device, and if not supported by the rendering device, then:
determining a first device-supported tone density level greater than the determined maximum tone density level and a second device-supported tone density level less than the determined maximum tone density level; and
rendering the object via an application of one or more scan lines comprising the first device-supported tone density level and the second device-supported tone density level less than the snapped tone density level.

8. The method of multilevel tone density rendering as claimed in claim 7 further comprising:
determining a median tone density level of a color component of the plurality of pixels of the object;
selecting or generating, based on the determined median tone density level, a halftone pattern having pixels characterized by the color component having the determined median tone density, wherein the halftone pattern pixels are characterized by a tone density level based on the determined median tone density level; and
wherein the step of rendering pixels of the object with the color component having the snapped tone density further comprises rendering a portion of the pixels of the object with the color component having the determined median tone density according to the selected or generated halftone pattern.

9. The method of multilevel tone density rendering as claimed in claim 8 wherein the rendered tone density of the color component having the determined median tone density level is associated with the selected or generated halftone pattern.

10. The method of multilevel tone density rendering as claimed in claim 8 further comprising:

testing of the object data characterized by three color components, each color component associated with a tone density level, whether the tone density level of each of the three color components of the object data are within a test range of tone density levels, relative to one another, and if true:
(a) determining a tone density level of a black component based on the three color density levels, and
(b) assigning the determined tone density level of the black component as the determined maximum tone density level of a color component of the object comprising a plurality of pixels characterized by at least one color component.

11. A method of multilevel tone density rendering comprising:
determining a maximum tone density level of a color component of an object wherein the object data comprises a plurality of pixels and the object data is characterized by at least one color component;
snapping the determined maximum tone density level based on a quantization level of a rendering device;
rendering the plurality of pixels of the object with the color component at the snapped tone density level;
determining a median tone density level of a color component of the plurality of pixels of the object data;
selecting or generating, based on the determined median tone density level, a halftone pattern having pixels characterized by the color component of the determined median tone density, and wherein the halftone pattern pixels are further characterized by a tone density level based on the determined median tone density level; and
wherein the step of rendering the plurality of pixels of the object with the color component having the snapped tone density further comprises rendering a portion of the plurality of pixels of the object with the color component of the determined median tone density according to the selected or generated halftone pattern.

12. The method of multilevel tone density rendering as claimed in claim 11 wherein the rendered tone density of the color component having the determined median tone density level is associated with the selected or generated halftone pattern.

13. A method of multilevel tone density rendering comprising:
determining a maximum tone density level of a color component of an object wherein the object data comprises a plurality of pixels and the object data is characterized by at least one color component;
snapping the determined maximum tone density level based on a quantization level of a rendering device; and
rendering the plurality of pixels of the object with the color component at the snapped tone density level;
testing whether the snapped tone density level is not supported by the rendering device, and if the snapped tone density level is not supported by the rendering device, then:
determining a first device-supported tone density level greater than the snapped tone density level and a second device-supported tone density level less than the determined maximum tone density level; and
rendering the object via an application of one or more scan lines comprising the first device-supported tone density level greater than the snapped tone density level and the second device-supported tone density level less than the snapped tone density level.

14. A method of multilevel tone density rendering comprising:

determining a maximum tone density level of a color component of an object wherein the object data comprises a plurality of pixels and the object data is characterized by at least one color component;

snapping the determined maximum tone density level based on a quantization level of a rendering device;

rendering the plurality of pixels of the object with the color component at the snapped tone density level; and testing of the object data characterized by three color components, each color component associated with a tone density level, whether the tone density level of each of the three color components of the object data are within a test range of tone density levels, relative to one another, and if true:

(a) determining a tone density level of a black component based on the three color density levels, and (b) assigning the determined tone density level of the black component as the determined maximum tone density level of a color component of the object comprising a plurality of pixels characterized by at least one color component.

15. The method of multilevel tone density rendering as claimed in claim 14 further comprising:

testing whether the snapped tone density level is not supported by the rendering device, and if not supported by the rendering device, then:

determining a first device-supported tone density level greater than the determined maximum tone density level and a second device-supported tone density level less than the determined maximum tone density level; and rendering the object via an application of one or more scan lines comprising the first device-supported tone density level greater than the snapped tone density level and the second device-supported tone density level less than the snapped tone density level.

* * * * *